US007573144B1

(12) United States Patent
Saban et al.

(10) Patent No.: US 7,573,144 B1
(45) Date of Patent: Aug. 11, 2009

(54) RECONFIGURABLE POWER SYSTEM USING MULTIPLE PHASE-SET ELECTRIC MACHINES

(75) Inventors: Daniel M. Saban, Corona, CA (US); Raed Ahmad, Placentia, CA (US); Zhiguo Pan, Rowland Heights, CA (US)

(73) Assignee: Direct Drive Systems, Inc., Cerritos, CA (US)

( * ) Notice: Subject to any disclaimer, the term of this patent is extended or adjusted under 35 U.S.C. 154(b) by 0 days.

(21) Appl. No.: 12/012,990

(22) Filed: Feb. 7, 2008

(51) Int. Cl.
*H02J 9/08* (2006.01)
(52) U.S. Cl. ...................................................... 290/4 R
(58) Field of Classification Search .................. 290/4 R
See application file for complete search history.

(56) References Cited

U.S. PATENT DOCUMENTS

| 2,783,393 | A | * | 2/1957 | Per-Erik Lindahl et al. ... 307/64 |
|---|---|---|---|---|
| 4,460,834 | A | * | 7/1984 | Gottfried ...................... 307/64 |
| 4,857,755 | A | * | 8/1989 | Comstock ..................... 307/47 |
| 5,398,571 | A | * | 3/1995 | Lewis ......................... 74/572.1 |
| 5,821,630 | A | * | 10/1998 | Schutten .................... 290/30 R |
| 6,020,657 | A | * | 2/2000 | Liran .......................... 307/64 |
| 6,169,390 | B1 | * | 1/2001 | Jungreis ........................ 322/4 |
| 6,507,128 | B2 | * | 1/2003 | King et al. ................ 290/40 C |
| 6,559,559 | B2 | * | 5/2003 | Cratty .......................... 307/64 |
| 6,563,229 | B2 | * | 5/2003 | Farkas ...................... 290/30 A |
| 6,879,053 | B1 | * | 4/2005 | Welches et al. ................ 290/6 |
| 6,969,922 | B2 | * | 11/2005 | Welches et al. ............. 290/1 A |
| 7,042,108 | B2 | * | 5/2006 | Farkas .......................... 290/3 |
| 7,071,581 | B2 | * | 7/2006 | Eisenhaure et al. ........... 307/64 |
| 7,108,095 | B1 | * | 9/2006 | Washington et al. ........ 180/165 |
| 7,129,593 | B2 | * | 10/2006 | King et al. .................. 290/4 C |
| 7,400,052 | B1 | * | 7/2008 | Badger ...................... 290/1 A |
| 2003/0137196 | A1 | * | 7/2003 | Liran .......................... 307/64 |
| 2007/0119639 | A1 | * | 5/2007 | Villagrana et al. .......... 180/65.2 |
| 2008/0203734 | A1 | * | 8/2008 | Grimes et al. ............. 290/40 R |

FOREIGN PATENT DOCUMENTS

GB     2246602 A   *   2/1992

* cited by examiner

*Primary Examiner*—Joseph Waks
(74) *Attorney, Agent, or Firm*—Irving Keschner

(57) ABSTRACT

A reconfigurable power system that includes a gas turbine, flywheel, a first electric machine coupled to the gas turbine, a second electric machine coupled to the flywheel, the first and second electric machines being substantially similar in configuration, a first power device for coupling power from the first electric machine to a power grid, a second power device coupled to the second electric machine for driving the flywheel and coupling power from the second electric machine to the power grid, and a switch for coupling either the power generated by the first electric machine or the second electric machine to the grid.

10 Claims, 6 Drawing Sheets

RECONFIGURABLE POWER SYSTEM USING MULTIPLE PHASE-SET ELECTRIC MACHINES

BACKGROUND OF THE INVENTION

1. Field of the Invention

A reconfigurable power system that comprises multiple loads and prime movers and electric machines connected to an AC bus via power electronic devices.

2. Description of the Prior Art

Efforts have been underway to develop high-speed generators and power converters used to transfer power between a high speed turbine, a high speed energy storage flywheel and a 450 Vrms, 3-phase, 60 Hz distribution system. The system would incorporate high speed generators which convert rotational energy to electrical energy, rectifiers that convert high frequency AC power to DC power and inverters which convert DC power to AC power. The system also includes a high frequency drive motor to allow charging of the flywheel energy store directly from the 450 Vrms 3-phase Hz distribution grid. During discharge of the flywheel energy store, the power flow can be directed to the 450 Vrms distribution grid or be rectified and routed through the inverters.

Although the system noted hereinabove when implemented, will meet the system requirements, it would be desirable if the system had the capability of being reconfigured such that the flywheel portion is essentially capable of operating as a full back-up to the turbine portion of the system. In addition, it would be desirable if the high speed generators were multiple phase-set electric machines.

SUMMARY OF THE INVENTION

The present invention provides a reconfigurable power system that comprises multiple loads and prime movers and electric machines connected to an AC bus utilizing multiple phase-set electrical machines in conjunction with suitable power electronic devices.

The advantages of this system is that common power electronic devices can be used for both the flywheel and turbine (both potential loads and prime movers), and common electric machines can be used for coupling with both flywheel and turbine. The nature of the power requirements of a flywheel are well suited for a multiple phase set electric machine. In particular, when providing power to the flywheel, the power demand is low and when power is extracted from the flywheel a much higher power capacity electric machine is needed. A multiple phase set electric machine can be configured to run on one phase set (or any number of phase sets corresponding to the number of power electronic devices dedicated for a variable frequency drive), when motoring the flywheel and all of the phase sets when providing power to the grid through the same power electronic devices normally used to provide power to the grid from the multiple phase set electric machine coupled to the turbine. Some built-in system redundancy can be provided, but if common electric machines are used and common electric power electronic devices are used, then what would otherwise be a special purpose variable frequency drive for motoring the flywheel can be eliminated in favor of one of the common power electronic devices. If a common power electronic device normally feeding generating power to the grid fails, then the system user has the option of re-configuring the system using the common power electronic device normally serving as a variable frequency device and vice versa. This system re-configuration could be performed on a real-time as needed basis; for example the flywheel could be powered periodically rather than continuously as the needs and priority of the system change.

The present invention thus provides an efficient power system comprising a number of electric machines with multiple phase set stators and power electronic devices (which may or may not include switch gear and filters) configured to provide bi-directional power flow through at least one of the electric machines. In particular, a first electric machine is coupled to a turbine engine and a second electric machine is coupled to a flywheel. The first electric machine is used as a motor to start the turbine and as a generator when the turbine is producing power. The second machine is used as a motor to "spin up" the flywheel and as a generator when the flywheel is providing power.

DESCRIPTION OF THE DRAWINGS

For a better understanding of the present invention as well as other objects and further features thereof, reference is made to the following description which is to be read in conjunction with the accompanying drawing wherein.

DESCRIPTION OF THE INVENTION

Figure 1:
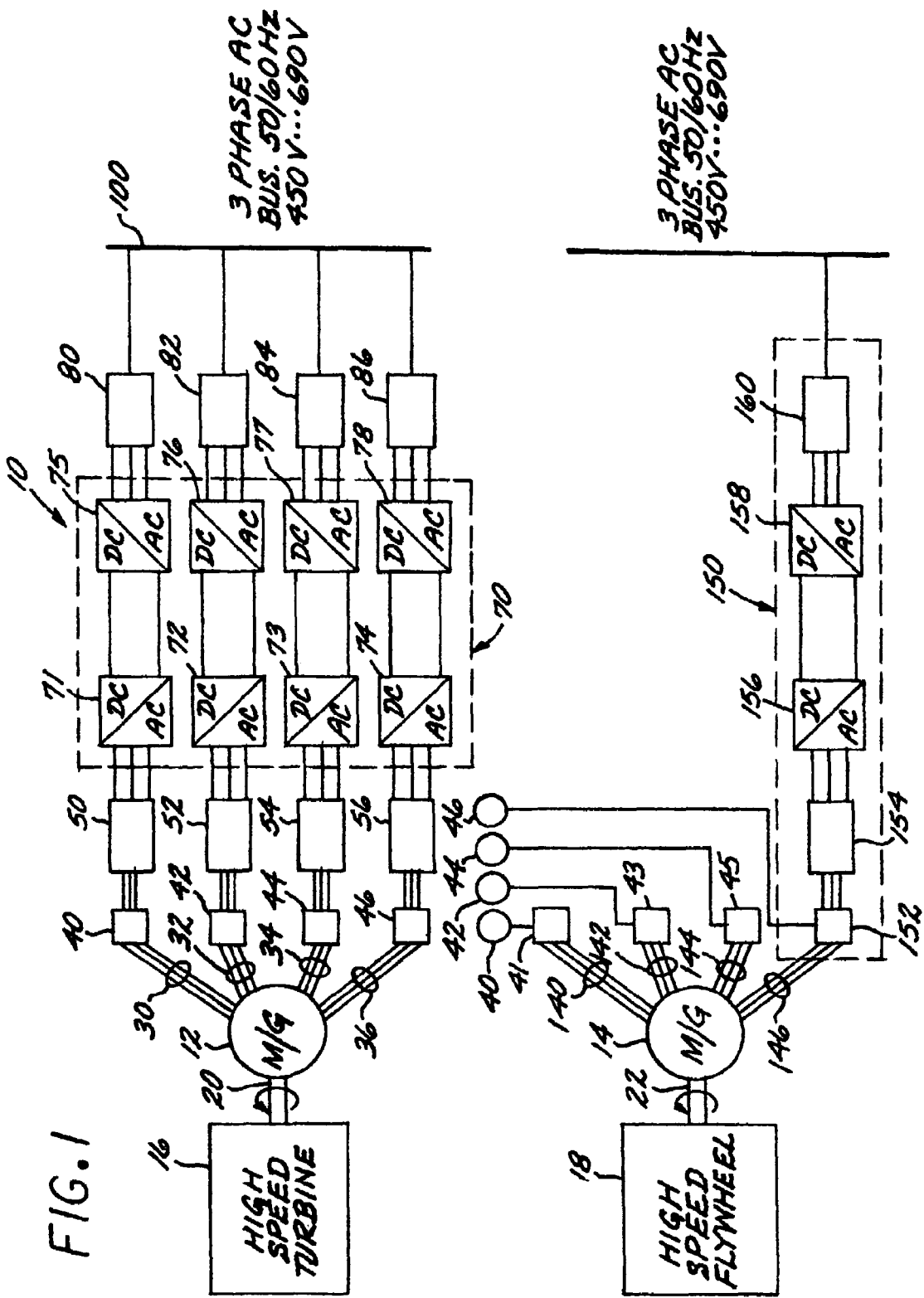
FIG. 1 illustrates a preferred embodiment of the system of the present invention.

Referring to FIG. 1, the reconfigurable power system 10 using multiple phase-set electric machines in accordance with the teachings of the present invention is illustrated. Electric machines 12 and 14 (although only two machines are illustrated, more than that number can be utilized) are illustrated as being coupled to turbine 16 and flywheel 18, respectively (although other prime movers can be utilized). System 10 is configured to provide bi-directional power flow in at least one of the electric machines 12 and 14. Electric machine 12, coupled via shaft 20 to turbine 16, can be used as a motor to start turbine 16 and, alternately, as a generator when turbine 16 is producing electric power. Electric machine 14, coupled to flywheel 18 via shaft 22, is used as a motor to "spin up" flywheel 18 and as a generator when the flywheel is generating electric power. As is well known, flywheels store kinetic energy to be used in driving a machine for a short time period and functions essentially as a back-up in case of a system power failure.

The preferred electric machine for use in system 10 is disclosed in copending application Ser. No. 11/751,450, filed May 21, 2007 and assigned to the assignee of the present invention. The advantages of using such a machine is described in that application and the teachings thereof necessary for an understanding of the present invention is incorporated herein by reference. The multi-phase winding sets used in the machine can be independent, space shifted, three phase winding sets. Each set is supplied by a dc-ac power electronics building block ("PEBB"), such as block 156 discussed hereinafter. Permanent-magnet machines are the preferred machine topology.

Sets of three phase windings 30, 32, 34 and 36 from machine 12 is coupled to switches 40, 42, 44 and 46 respectively. The output from switches 40, 42, 44 and 46 are coupled to input/output filters 50, 52, 54 and 56, respectively (the system can operate without the filters if necessary). The output from the filters are coupled to block 70 (first power device) comprising a series of AC/DC and DC/AC converters, the output therefrom being coupled to input/output filters 80, 82, 84 and 86, the outputs of which are coupled to three-phase AC bus 100, bus 100 operating at a frequency range between 50 and 60 hz and at a voltage range between 450V and 1000 VAC. The AC/DC converters comprise blocks 71, 72, 73 and 74 and the DC/AC converters comprise blocks 75, 76, 77 and 78. It should be noted that the converter blocks are bi-directional i.e. they can be used as either AC/DC or DC/AC converters.

Referring to that portion of system 10 involving flywheel 18, the output from four sets of three phase winding 140, 142, 144 and 146 are, in one version, coupled to switches 40, 42, 44 and 46, the system then operating in the manner described hereinabove with reference to machine 12. In some modes of operation, three phase winding 146 is connected to power device 150 comprising switch 152, input/output filter 154, AC/DC converter 156 DC/AC converter 158 and input/output filter 160. The output of power device 150 is connected to three phase AC bus 101. Blocks 41, 43 and 45 are part of the dual-pole double system throw switches that either connect the high speed turbine 16 and motor/generator 12 to grid 100 or motor/generator 14 and flywheel 18 to grid 101.

The flywheel generates power while the gas turbine 16 is generating power through the high speed generator 12 or when gas turbine 16 is disconnected from the system 10.

The system 10 described hereinabove has three modes of operation. In the first mode, blocks 150, powered by bus 101, causes machine 14 to operate as a motor to spin-up flywheel 18 (switch 152 closes the connection between machine 14 and PEBB 150) and switches 40, 42, 44 and 46 connect machine 12, operating as a generator, to grid 100 through the filters and block 70. In the second mode (FIG. 3), blocks 150, powered by bus 101, causes machine 14 to operate as a motor to maintain power on the flywheel 18 (switch 152 is open) and switches 40, 42, 44 and 46 connect machine 12, operating as a generator, to grid 100 through the filters and block 70. When there is a failure (FIG. 4) in gas turbine 16 or generator 12 (or if there is a requirement for power from the flywheel), switches 40, 42, 44 and 46 disconnect generator 12 and turbine 16 and instead connect to machine 14 which is running as a generator as flywheel 18 feeds power back to grid 100 through the filters 50, 52, 54 and 56 and block 70.

In an alternate mode of operation, when the system requests power simultaneously from gas turbine 16 and flywheel 18, flywheel 18 is sized to handle the peak load (turbine power, base load and any pulsed load or overload) so when flywheel 18 is on line it provides sufficient power for the total peak load. This eliminates the need for gas turbine 16 to supply power to the load thereby providing a system with improved efficiency over the prior art since gas turbine 16 is optimized for the base load only and would be unloaded when the load increases beyond the base load.

Under normal operation, the switch blocks are connecting the gas turbine 16 to PEBB block, or converter, 70 and then to AC grid 100; at this time, switch 152 is connecting the motor 14 to flywheel 18 to keep the flywheel spinning, i.e. storing energy and ready for use. When the generator 12 and turbine 16 is disconnected from the system by switches 40, 42 . . . 46 the flywheel generator 14 is connected to feed the base load and the additional pulsed or peaking load. When a pulsed or peaking load is completed, switches 40, 42 . . . 46 reconnect gas turbine 16 which is still operational even through having been disconnected from the system. The switch 152 connecting flywheel 18 is the same as switches 40, 42 . . . 46 and comprise dual pole transfer switches, either for connecting the generator turbine/generator to the AC grid 100 or for connecting the flywheel/generator 14, 18 to the grid 101.

The PEBB is used to control the electric machine coupled to the turbine such that it switches between functioning as a motor or a generator "on the fly" i.e. the direction of power flow determines if the electric machine is a motor or generator (the PEBB corresponds to the AC/DC blocks forming converter 70). Alternatively, a separate active module could be used for motoring and a separate possible module used for generating. In this case, a contactor can be used to toggle which PEBB is active. In the case of starting the turbine 16 and then using the turbine as a prime mover, the contactor would only be switched after the rotation of the turbine is self-sustained. Otherwise, any active PEBB would be used without a contactor.

Each PEBB preferably comprises a three-phase diode bridge or active rectifiers (diode blocks are not used as dc-ac blocks; if a 2-level insulated-gate bipolar transistor three phase bridge is used as a AC/DC converter then the same bridges can be used as DC/AC converter).

The time-dominant mode of operation for the electric machine coupled to the flywheel is low power motoring (only providing make-up and initial spin-up power).

The key differences between both power paths are the time involved and the disparate power levels for motoring and generating for the turbine and flywheel.

Since the charge/discharge (motoring/generating) cycles of the flywheel are significantly disproportionate in power requirements, the ability to have a variable frequency device 150 essentially $\chi/N$ (wherein $\chi$ is preferably 1 and N the number of phase sets) allows the system to use the same PEBB's for both turbine generating and flywheel generating.

In summary, system 10 provides a power generation system that consists of a gas turbine/generator (or multiples thereof) and a motor/generator that is spinning a flywheel. System 10 can be a stand alone network or can be used to support an existing AC network handling peak loads. For example, the AC network might be able to handle 5 MW continuously, but there can be loads that can come in and out intermittently that are approximately 10 MW. In that case, system 10 can be used to support the extra load. A unique feature of the system 10 is that the same machine, configured as a space shifted split stator as disclosed in the copending '450 application can be used to be the generator rotated by gas turbine 16 and also the motor/generator 14 spinning flywheel 18 (as a motor) and rotated by the flywheel acting as a generator. The PEBB's used in the system can also be identical on the AC/DC side and DC/AC side. One block that is AC/DC can be used to spin, or rotate, the motor that spins up flywheel 18. Multiples (N) of the same blocks can be utilized to convert the energy from the flywheel/generator 18 to feed back to the bus, or grid, 100. The same blocks are used to convert the energy from the gas turbine generator 16 to the common AC bus, or grid, 100. The reconfiguration enables switching between the flywheel/generator 14, 18 and gas turbine/generator 12, 16 without having to bring in new PEBB's assuming that the gas turbine generator and flywheel do not have to be on at the same time.

System 10 can be adapted to the following configurations: (1) using multiple PEBB's that are switched from the flywheel subsystem to the gas turbine subsystem; (2) the flywheel subsystem contains at least one conventionally wound three-phase machine; (3) the flywheel sub-system contains multiple flywheels, motor/generators, PEBB modules, not necessarily in a 1:1:1 relationship.

Figure 2:
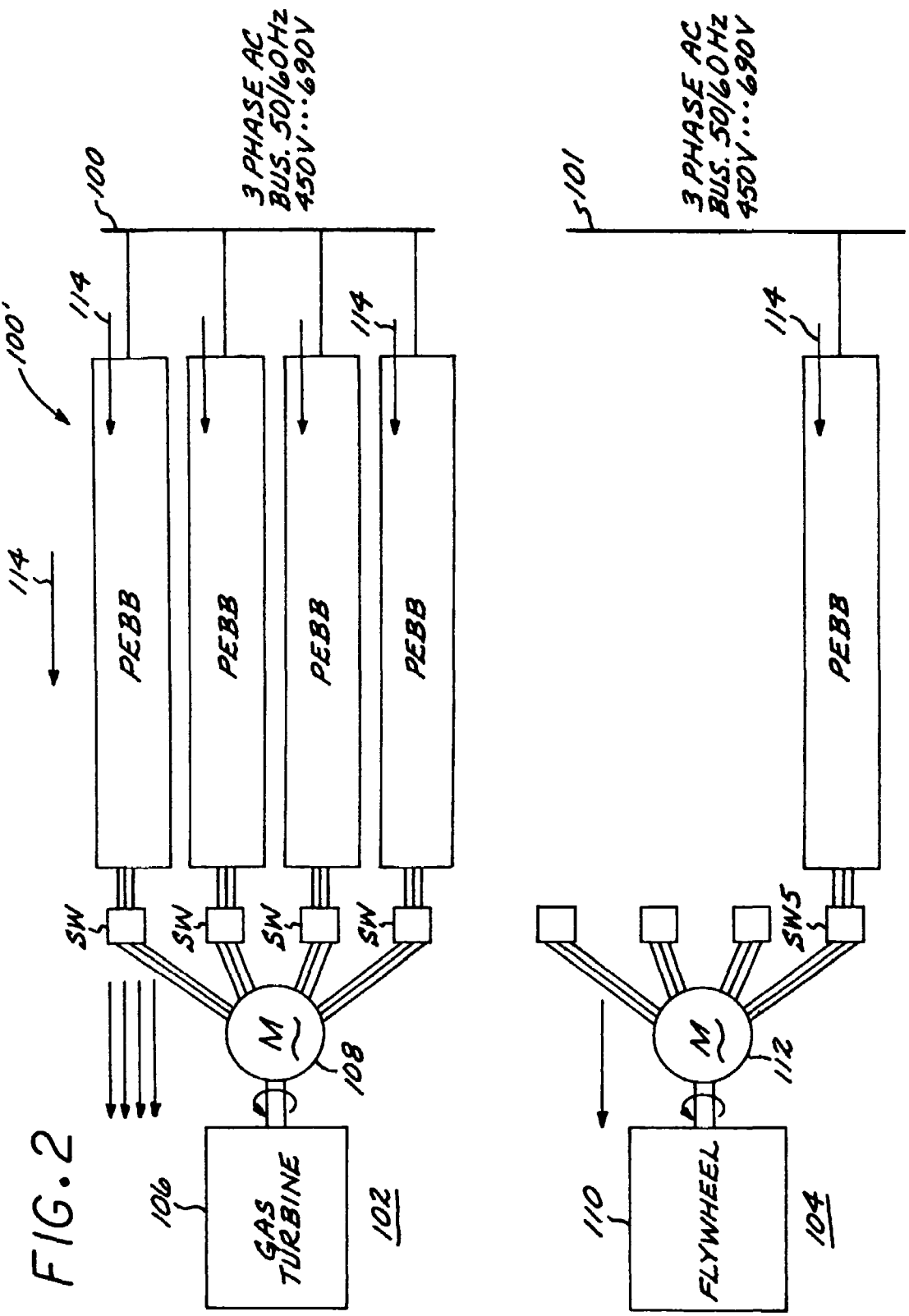
FIG. 2 illustrates an operating mode of the preferred embodiment shown in FIG. 1 wherein the electric machine acts as a motor to start the turbine and the flywheel portion of the system is charging, both sub-systems being independent.

FIG. 2 illustrates a variation of the system shown in FIG. 1. In particular, system 100' comprises subsystems 102 and 104, sub-system 102 functioning to start gas turbine (generator) 106 via motor 108. Sub-system 104 functions to charge (rotate) flywheel 110 utilizing motor 112. The power flow of sub-systems 102 and 104 is in the direction illustrated by arrow 114. Subsystems 102 and 104 function independently of each other.

Figure 3:
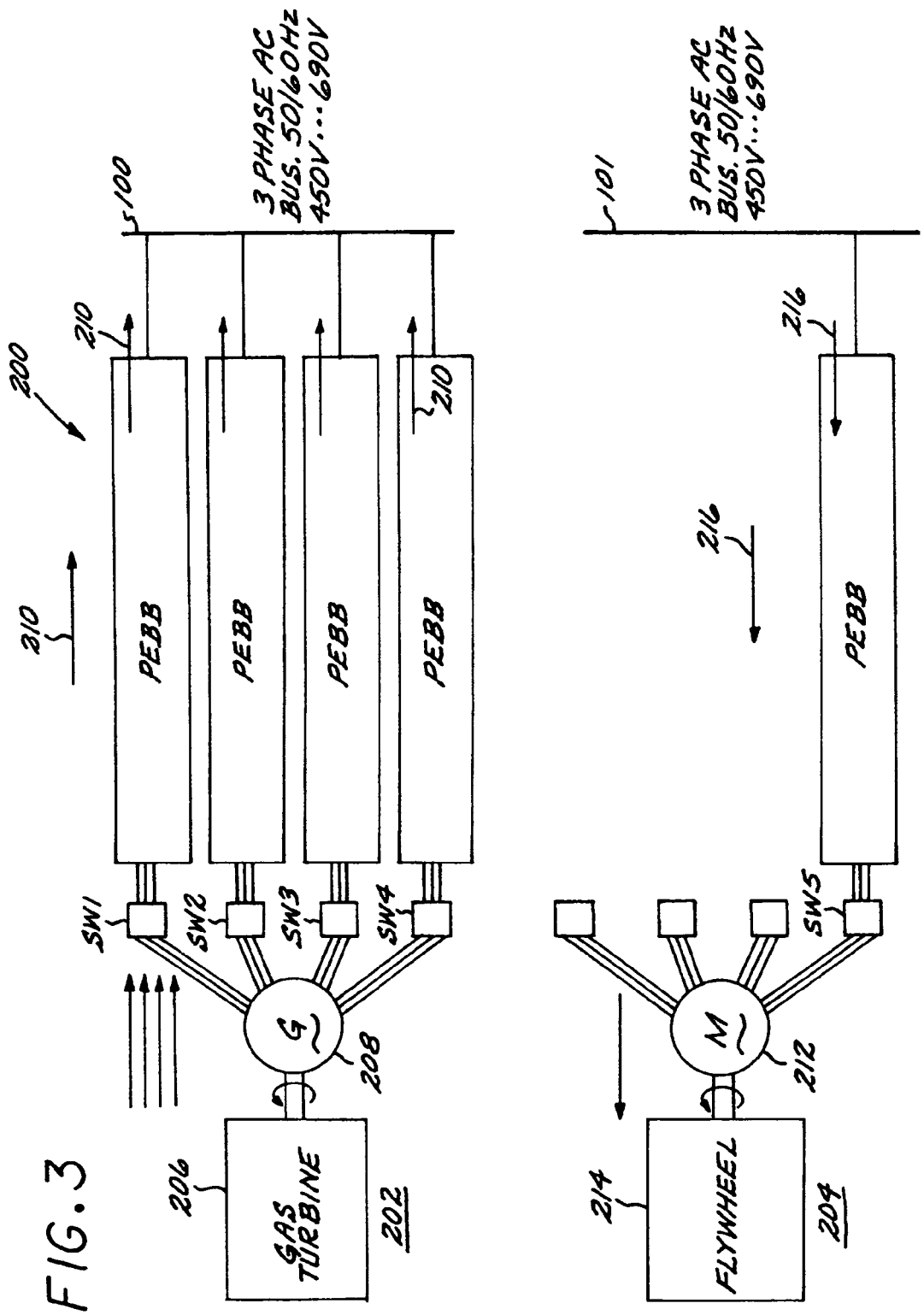
FIG. 3 illustrates an operating mode of the preferred embodiment shown in FIG. 1 wherein the turbine operates to run the elective machine as a generator and the flywheel is charging, each sub-system acting independently.

FIG. 3 illustrates the system of FIG. 1 wherein (system 200 comprising sub-systems 202 and 204) gas turbine 206 in sub-system 202 operates in a manner such that generator 208 generates AC power in the direction of arrows 210. Sub-system 204 utilizes motor 212 to charge (rotate) flywheel 214. Power flows in the direction of arrow 216. Sub-system 202 and 204 act independently of each other. In this mode of operation, motor 212 is used to provide make-up and initial spin-up power for flywheel 214.

Figure 4:
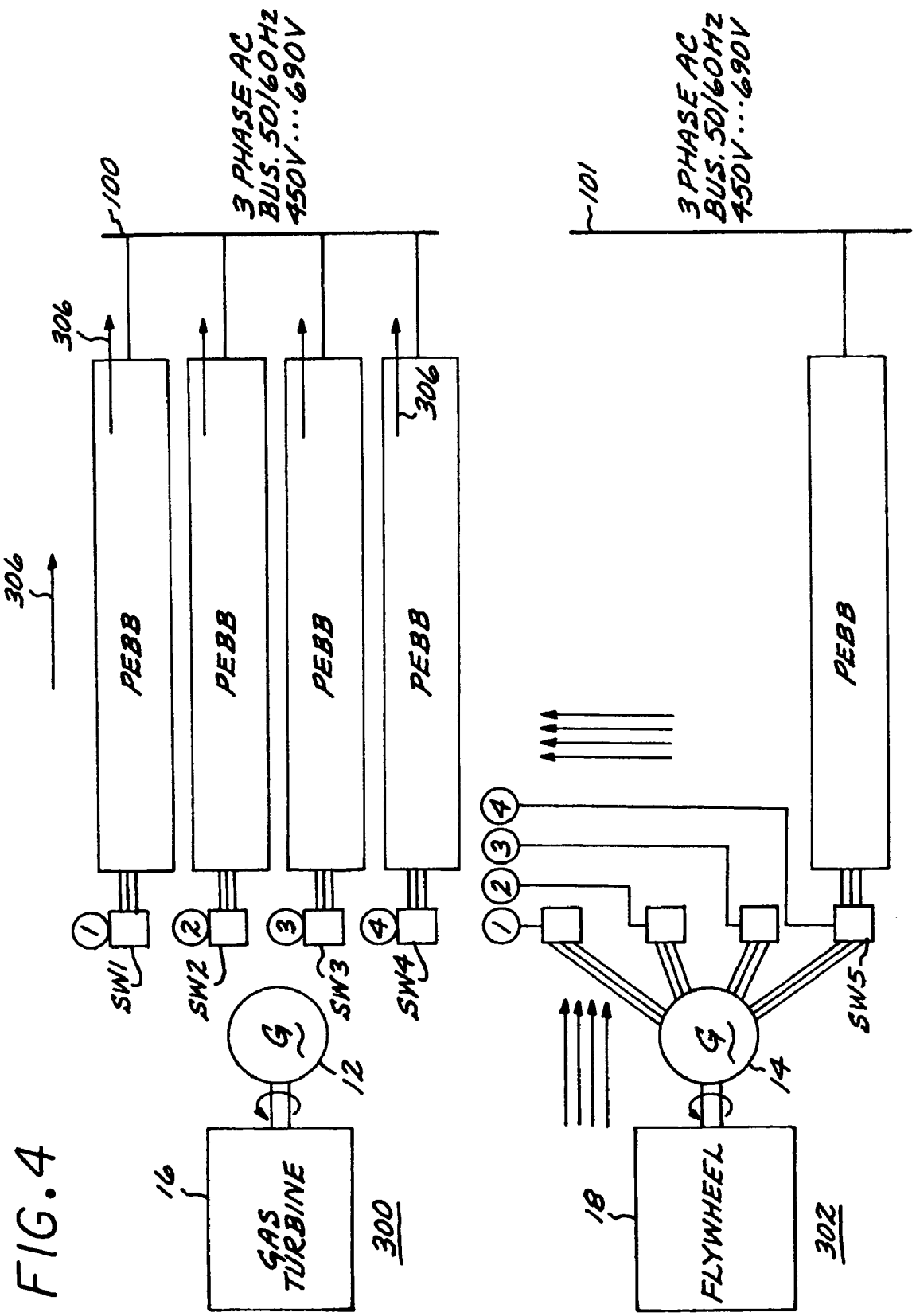
FIG. 4 illustrates an operating mode of the preferred embodiment shown in FIG. 1 wherein the gas turbine is off-line and the flywheel is discharging, both sub-systems acting cooperatively.

FIG. 4 illustrates the system of FIG. 1 wherein the gas turbine 16 is off-line and flywheel 18 is discharging (rotating) and causing generator 12 to generate power. Since sub-systems 300 and 302 act cooperatively, the power from generator 14 flows to the switches in sub-system 302 and then to the grid 100 as illustrated by arrows 306.

Figure 5:
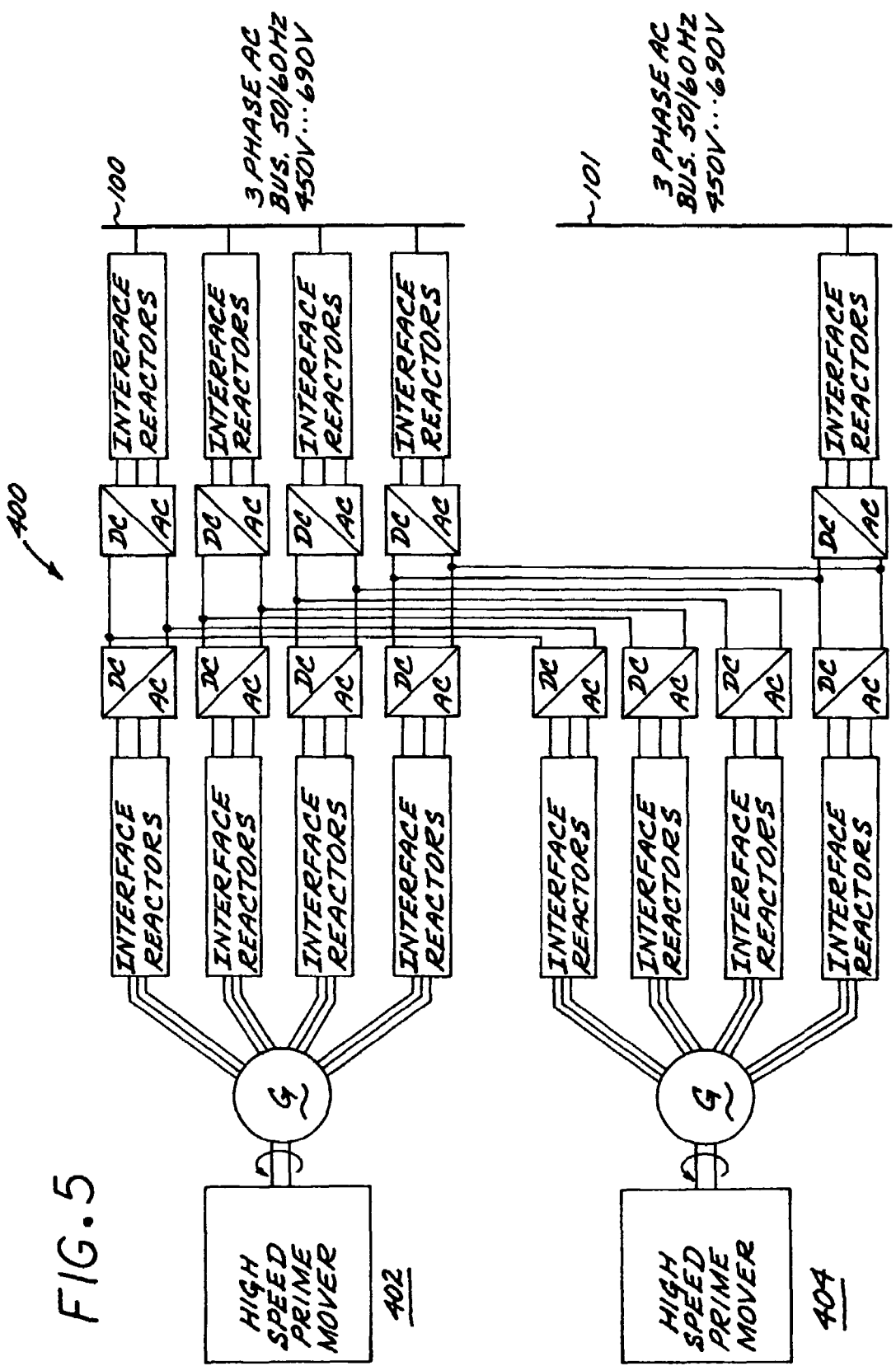
FIG. 5 illustrates an alternative embodiment wherein a DC connection is provided.

FIG. 5 illustrates system 400 comprising sub-systems 402 and 404. The system provides a DC connection wherein prime movers 406 and 408 operate simultaneously. In particular, sub-systems 402 and 404 share a DC connection whereas in FIG. 4 an AC connection is shared.

Figure 6:
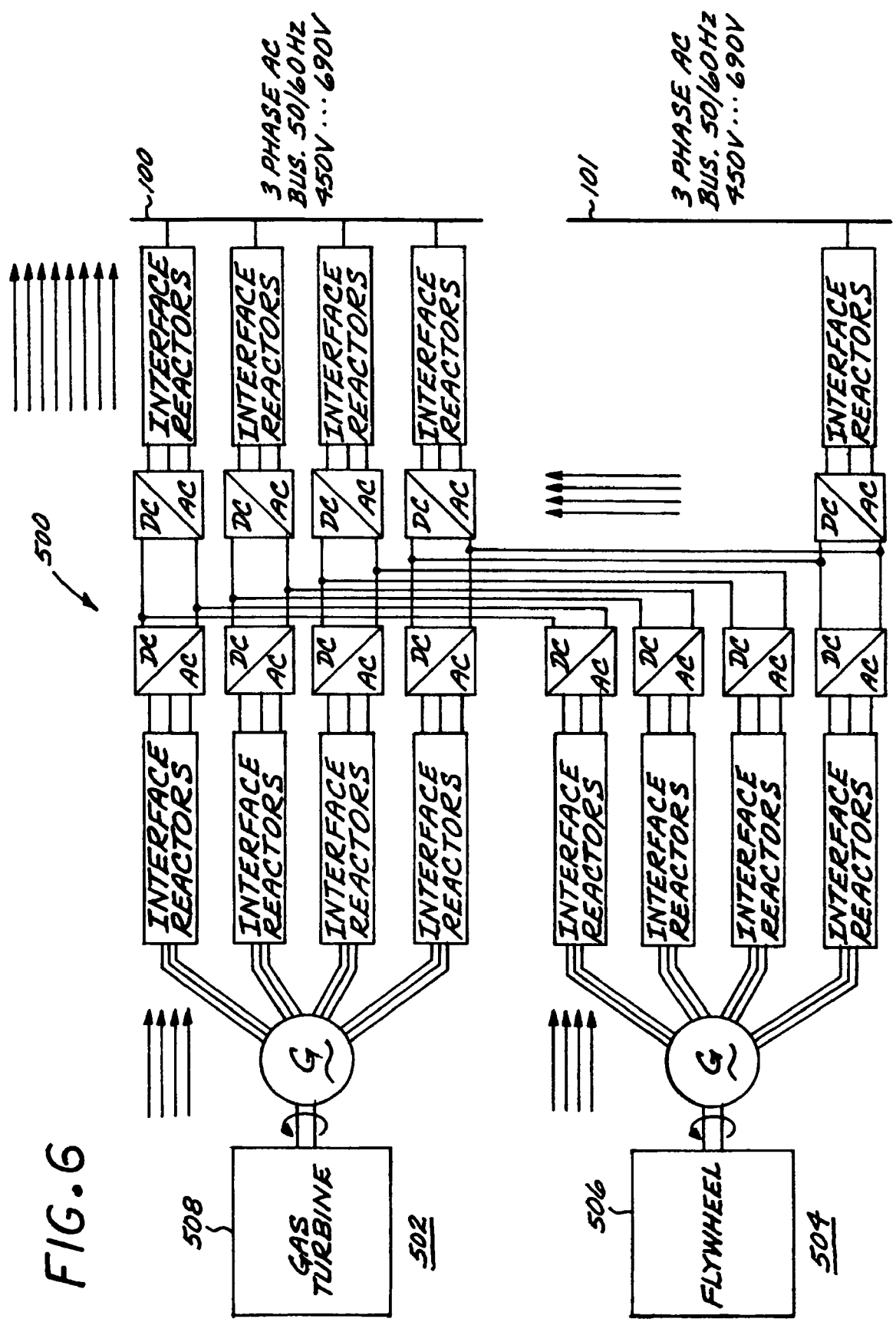
FIG. 6 illustrates an operating mode of system shown in FIG. 5 wherein the gas turbine is on-line and the flywheel is discharging, both sub-system acting cooperatively.

FIG. 6 illustrates system 500 comprising sub-systems 502 and 504, an operating mode of system 400. System 500 is used to meet temporary peak power demand. In particular, flywheel 504 has the capacity to work simultaneously with gas turbine 508 to meet peak power demand. In this system the gas turbine DC/AC modules are rated for peak power and can use passive rectification and flywheel AC/DC modules are selected for active rectification and are rated for flywheel charging. The negative DC connection can be always active; the positive DC connection requires a contactor for safety and/or margin reasons.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A power system for supporting an AC network comprising:
   a gas turbine;
   a flywheel for providing power when the peak loads exceed a predetermined level;
   a first electric machine having a first AC interface coupled to said gas turbine;
   a second electric machine having a second AC interface coupled to said flywheel, said first and second electric machines being substantially identical;
   a first power device for coupling power from said first electric machine to an AC power grid;
   a second power device coupled to said second electric machine for driving said flywheel and coupling power from said second electric machine to said AC power grid, said first power device and said second power device being substantially identical; and
   means for interconnecting first and second switch means at said first and second AC interfaces or through said AC power grid.

2. The system as defined in claim 1 wherein in a first mode of operation said first electric machine delivers power to said grid and wherein said second electric machine drives said flywheel.

3. The system of claim 2 wherein in a second mode of operation said first electric machine is inhibited from generating power and wherein said flywheel causes said second electric machine to deliver power to said grid.

4. The system of claim 3 wherein in said second mode of operation said second electric machine delivers power to said grid through said first power device.

5. The system of claim 4 wherein in a third mode of operation said first and second electric machines deliver power to said grid simultaneously.

6. A method for supporting an AC network utilizing a power system comprising the steps of:
   providing a gas turbine;
   providing a flywheel to provide power when the peak loads exceed a predetermined level;
   coupling a first electric machine having a first AC interface to said gas turbine;
   coupling a second electric machine having a second AC interface to said flywheel, said first and second electric machines being substantially identical;
   providing a first power device for coupling power from said first electric machine to an AC power grid;
   providing a second power device coupled to said second electric machine for driving said flywheel and coupling power from said second electric machine to said AC power grid said first power device and said second power device being substantially identical; and
   providing means for interconnecting first and second switch means at said first and second AC interfaces or through said AC power grid.

7. The method as defined in claim 6 wherein in a first mode of operation said first electric machine delivers power to said grid and wherein said second electric machine drives said flywheel.

8. The method of claim 7 wherein in a second mode of operation said first electric machine is inhibited from generating power and wherein said flywheel causes said second electric machine to deliver power to said grid.

9. The method of claim 8 wherein in said second mode of operation said second electric machine delivers power to said grid through said first power device.

10. The method of claim 9 wherein in a third mode of operation said first and second electric machines deliver power to said grid simultaneously.

* * * * *